(12) United States Patent
Harima et al.

(10) Patent No.: US 7,270,863 B2
(45) Date of Patent: Sep. 18, 2007

(54) RESIN-MADE INTERIOR MEMBER FOR OPENING AND CLOSING BODY AND MOLDING DIE AND MOLDING METHOD THEREFOR

(75) Inventors: Issei Harima, Higashihiroshima (JP); Yoshiaki Saito, Ichihara (JP); Takahiro Tochioka, Aki-gun (JP)

(73) Assignee: DaikyoNishikawa Corporation, Hiroshima-ken (JP)

( * ) Notice: Subject to any disclaimer, the term of this patent is extended or adjusted under 35 U.S.C. 154(b) by 0 days.

(21) Appl. No.: 10/513,863

(22) PCT Filed: Apr. 28, 2003

(86) PCT No.: PCT/JP03/05435

§ 371 (c)(1),
(2), (4) Date: Apr. 28, 2005

(87) PCT Pub. No.: WO03/092984

PCT Pub. Date: Nov. 13, 2003

(65) Prior Publication Data

US 2005/0202223 A1   Sep. 15, 2005

(30) Foreign Application Priority Data

Apr. 30, 2002   (JP) ............................. 2002-128787

(51) Int. Cl.
*B32B 3/02* (2006.01)
*B32B 25/04* (2006.01)
*B29C 45/00* (2006.01)
*B29C 45/03* (2006.01)
*B29C 65/02* (2006.01)

(52) U.S. Cl. ........................ 428/45; 428/492; 264/478; 425/190; 425/191

(58) Field of Classification Search ............. 264/297.4, 264/328.7, 328.8
See application file for complete search history.

(56) References Cited

U.S. PATENT DOCUMENTS 4,083,903 A * 4/1978 Gilbert et al. ............. 264/40.3
4,965,028 A * 10/1990 Maus et al. ............... 264/297.2
5,799,991 A * 9/1998 Glance ....................... 293/121

(Continued)

FOREIGN PATENT DOCUMENTS

EP   0 887 168   12/1998

(Continued)

*Primary Examiner*—Rena Dye
*Assistant Examiner*—Brett A Crouse
(74) *Attorney, Agent, or Firm*—Hamre, Schumann, Mueller & Larson, P.C.

(57) ABSTRACT

A resin-made interior member for an opening and closing body of the invention is a resin-made interior member to be attached to an inside of an outer panel of the opening and closing body and is formed by an injection molding method using a molding material of polypropylene type resin containing a reinforcing fiber and rubber and by properly setting the respective contents of the reinforcing fiber and the rubber component, the modulus of bend elasticity is improved by blending the reinforcing fiber without being accompanied with deterioration of the moldability as the material resin and the appearance of the molded product to improve rigidity of the interior member and impact resistance is assured by blending the rubber component to give the interior member with good moldability and appearance in form of the molded product and having a required rigidity and impact resistance.

5 Claims, 9 Drawing Sheets

U.S. PATENT DOCUMENTS 6,157,416 A * 12/2000 Whitelaw et al. ............ 348/789
6,747,086 B2 * 6/2004 Guebitz ...................... 524/495

FOREIGN PATENT DOCUMENTS

| JP | 61-72039 | 4/1986 |
| JP | 1-129052 | 5/1989 |
| JP | 6-57054 | 3/1994 |
| JP | 7-112457 | 5/1995 |
| JP | 7112457 | * 5/1995 |
| JP | 9-314614 | 12/1997 |
| JP | 9314614 | * 12/1997 |
| JP | 11-228759 | 8/1999 |
| JP | 11-333883 | 12/1999 |
| JP | 2000-239437 | 9/2000 |
| JP | 2001-18654 | 1/2001 |
| JP | 2001-277851 | 10/2001 |

* cited by examiner

RESIN-MADE INTERIOR MEMBER FOR OPENING AND CLOSING BODY AND MOLDING DIE AND MOLDING METHOD THEREFOR

BACK GROUND OF THE INVENTION

1. Field of the Invention

The invention relates to a resin-made interior member to be attached to the inside of an outer panel of an opening and closing body, molding die therefore and method of molding the same.

2. Description of the Related Art

As known well, with respect to an opening and closing body such as a door, a bonnet, a trunk lid, a sunroof, a lift gate (also called as a tail gate, a rear gate, or a back door and the like) to be installed in a vehicle such as an automobile, in recent years, those produced from synthetic resins have been used practically for the outer panels and/or inner panels (e.g. reference to Japanese Patent Laid-Open Publication No. 2001-18654).

Such an opening and closing body is generally composed by bonding or welding an inner member (inner panel), an inner frame body (inner frame) or additionally thereto or solely an interior member (inner trim) to the inside of an outer panel.

In the case of manufacturing interior members such as the above-mentioned inner panel, inner frame or inner trim, conventionally, in consideration of reliable moldability and mass productivity, for example, it has been very common to manufacture them by press-molding sheet materials including, as base materials, thermosetting resin-based FRP (fiber-reinforced plastic) materials and thermoplastic resins such as polypropylene resins and glass mats inserted into the base materials. Particularly, for those with complicated shapes (e.g. the inner trim), thermoplastic resin-based materials have been used frequently in terms of the importance of the moldability.

However, a conventional manufacturing method of the interior members requires troublesome secondary processing such as drilling and burr removal after the press-molding, and thus the method involves a large number of steps and takes time and labor. As a result, the opening and closing body manufacturing step becomes also complicated. In the case of forming holes in a molded product, if an injection molding method is employed, such a problem can be solved generally by properly designing the molding die to make post-processing (secondary processing after molding) unnecessary in many cases.

Further, with respect to reinforcing fibers such as glass fibers intermixed with the resin materials, the fibers have a length around 10 mm, for example, and are so-called long fibers and therefore, conventionally, a large number of recessions and projections attributed to the glass fibers are formed on the surface of a molded article (a product) to significantly deteriorate the appearance.

To deal with such a problem of the appearance, it may be possible to set the fiber length of the glass fibers shorter, however in such a case, there occurs another problem that the strength and impact resistance are deteriorated accordingly.

Alternatively, it is also possible to coat the surface of the molded article to improve the appearance. However, in this case, a coating process is required additionally to result in considerable manufacturing cost up.

In addition, with respect to the above-mentioned opening and closing body, it is often to coat at least the outer face. Therefore, in the case of using resins for manufacturing the body, the outer member (outer panel) for the opening and closing body is required to have good coatability. Accordingly, materials such as resin materials produced from PC (polycarbonate) resins and ABS (acrylonitrile-butadiene-styrene) resins as raw materials from which molded articles with good surface state have been used.

However, in the case of manufacturing an outer panel from such a resin material, it is very difficult to stably obtain sufficient rigidity and impact resistance as the outer panel and consequently, it results in a problem that the rigidity and the impact resistance of the opening and closing body become insufficient. In such a case, the inner panel is also required to have high rigidity and impact resistance.

Further, in the case a molded body with a relatively large size and spread approximately in a plane such as an inner panel of an opening and closing body of an automobile is produced by resin molding, it is generally difficult to keep good balance of shrinkage in the respective parts and in the respective directions at the time of solidification of the melted resin packed in a molding die and it is thus easy to cause deformation such as warping Particularly, in the case of using a resin material mixed with a reinforcing fiber, the fiber orientation and its degree of the reinforcing fiber differ in the respective parts and in the respective directions, and attributed to the difference of the shrinkage extent caused accordingly, it occurs a problem that deformation, e.g. warping is easily caused in the resulting molded product.

For example, in the case of molding an interior member with an entire outer shape of approximately rectangular or so in a front view, just like the above-mentioned inner panel, in the end portions and their peripheries relatively remote from a gate set in the inside of the outer shape, a resin current which flows along the side rim part of the outer shape and is packed in the direction along the outer circumferential line of the end part and another resin current which is packed in another different direction (e.g. in a direction approximately perpendicular to the outer circumferential line) are generally different from each other in the flow speed (that is, the filling speed of the melted resin to be packed). For example in the case of the above-mentioned inner panel, in general, because the center region includes many roughened portions and parts with uneven thickness, the resin current in the direction along the outer circumferential line flows at a higher flow rate than resin currents in different directions.

Accordingly, if the difference is significant to a certain extent or more, since the resin current in the direction along the outer circumferential line of the above-mentioned rim part is packed rather quickly and therefore, the fiber orientation degree is extremely increased in the direction along the outer circumferential line in the above-mentioned rim part and much different from the fiber orientation of the reinforcing fiber in the center portion of the interior member. Attributed to the difference of the fiber orientation, there occurs a problem that the portion about the center along the outer circumferential line is warped (deformed) as to expand out of the surface in the rim part of the above-mentioned interior member.

In consideration of the above-mentioned problems, the invention has been developed and aims to provide a resin-made interior member for an opening and closing body with good moldability and outer appearance as a molded product and having needed rigidity and impact resistance and scarce deformation, and also to provide a molding die and molding method for the interior member.

DISCLOSURE OF THE INVENTION

To accomplish the above -mentioned aim, according to a first aspect of the invention, there is provided a resin-made interior member for an opening and closing body which is to be attached to the inner side of the outer panel of the opening and closing body, and the interior member is molded by an injection molding method using a molding material of a polypropylene type resin containing a reinforcing fiber and rubber.

The polypropylene type resin includes homopolypropylene resin, block copolymer type polypropylene resin, a random copolymer type polypropylene resin, and a modified polypropylene resin. And, the interior member made of resin according to the invention may be obtained by using one or a plurality of types among the above-mentioned polypropylene resin. The block copolymer type polypropylene resin is preferable and a blend containing the block copolymer type polypropylene resin and the modified polypropylene resin is more preferable. In this case, the blending ratio of the modified polypropylene resin is preferably 0. 1 to 5% by weight and more preferably 1 to 4% by weight in the total of, for example, the block copolymer type polypropylene resin, rubber and the reinforcing fiber.

Further, in a second aspect of the invention, with respect to the first aspect of invention, the outer panel is made of a resin and the molding material contains a polypropylene type resin containing a reinforcing fiber and a resin material containing rubber.

Furthermore, in a third aspect of the invention, with respect to the first or the second aspect of the invention, the blending ratio by weight of the reinforcing fiber, the polypropylene type resin, and the rubber in the molding material is (20 to 50):(30 to 75):(5 to 20).

The blending ratio by weight of the reinforcing fiber is 20 to 50%, since if it is less than 20%, prescribed modulus of bend elasticity cannot be obtained and if it exceeds 50%, the appearance is deteriorated. The blending ratio by weight of the rubber is 5 to 20%, since if it is less than 5%, prescribed impact resistance cannot be easily obtained and if it exceeds 20%, it becomes hard to assure the moldability.

Furthermore, in a fourth aspect of the invention, with respect to the second or the third aspect of the invention, the modulus of bend elasticity is adjusted to be not lower than that of the outer panel made of the resin.

Furthermore, in a fifth aspect of the invention, with respect to any one of the first to fourth aspects of the invention, the modulus of bend elasticity is 4,000 MPa or higher.

The lower limit of the modulus of bend elasticity is set to be 4,000 MPa and that is because even in the case the resin-made outer panel is molded by using a resin material including PC (polycarbonate) resin and ABS (acrylonitrile-butadiene-styrene) resin which is relatively common as a resin material for a panel member of an automobile as raw materials and its rigidity is about 3,500 to 3,800 MPa on the basis of modulus of bend elasticity, which is not necessarily sufficient for the outer panel of the opening and closing body of an automobile, if the modulus of bend elasticity of the interior member is this value or higher, the rigidity of the opening and closing body can reliably be heightened and a prescribed rigidity can be obtained owing to the modulus of bend elasticity of the interior member assured to be 4,000 MPa or higher.

Furthermore, in a sixth aspect of the invention, with respect to any one of the first to fifth aspects of the invention, in a case a rectangular shape circumscribed to the interior member in a front view is assumed, a thin part is provided in a periphery of an end portion of the interior member in a direction along a predetermined side of the rectangular shape while being extended approximately in parallel to either an other side of the rectangular shape crossing the predetermined side or an outer circumferential line of the interior member extended in approximately a same direction of another side.

In this case, it is preferable to select a side circumscribed to the outer circumferential line where deformation of the inner member most easily occurs as the predetermined side of the above-mentioned rectangular shape.

Furthermore, in a seventh aspect of the invention, with respect to any one of the first to fifth aspects of the invention, in a case a rectangular shape circumscribed to the interior member in a front view is assumed, a thick part is provided in the periphery of an end portion of the interior member in a direction along an other side of the rectangular shape crossing a predetermined side while being extended approximately in parallel to either the predetermined side or an outer circumferential line of the interior member extended approximately in the same direction of the predetermined side.

Also, in this case, it is preferable to select a side circumscribed to the outer circumferential line where deformation of the inner member most easily occurs as the predetermined side of the above-mentioned rectangular shape.

Furthermore, in an eighth aspect of the invention, with respect to the sixth or seventh aspect of the invention, the above-mentioned inner member has an opening for a window.

According to a ninth aspect of the invention, there is provided a molding die of a resin-made interior member to be attached to an inner side of an outer panel of an opening and closing body, wherein the molding die includes a terminal cavity part corresponding to the terminal part of the interior member; a gate cavity part having a gate for a resin material injection; a thick cavity part having a gap size wider than that of both of the former cavities and provided approximately in parallel to the terminal cavity part between the former cavities; and a cavity path for introducing the resin material injected through the gate to the thick cavity part via the gate cavity part, and then to the terminal cavity part.

According to a tenth aspect of the invention, there is provided a molding method of a resin-made interior member to be attached to an inner side of an outer panel of an opening and closing body, wherein the molding method involves passing a resin material injected to a molding die from a gate to a thick cavity part corresponding to a thick part set approximately in parallel to a terminal part in a periphery of the terminal part of the interior member, and then to a terminal cavity part corresponding to the terminal part.

According to an eleventh aspect of the invention, there is provided a molding method of a resin-made interior member to be attached to an inner side of an outer panel of an opening and closing body, wherein the molding method involves molding by using a molding die provided with a hindrance means for hindering a fiber-containing resin material injected in the molding die from a gate from orienting in a same direction as an outer circumferential line in a molding cavity part corresponding to the outer circumferential line of the interior member.

As the above-mentioned hindrance means, a molding cavity part corresponding to the thick part of the sixth aspect of the invention or the thin part of the seventh aspect of the invention is preferable and further, a molding cavity part corresponding to the outer circumferential line of the interior member with a variety of structures capable of disturbing the flow of a melted resin to the molding cavity part corresponding to the outer circumferential line of the interior member, such as a molding cavity part corresponding to a rib and a boss can effectively be used.

According to the first aspect of the invention, since the molding material of the polypropylene type resin containing the reinforcing fiber and rubber is used for the resin-made interior member to be attached to the inner side of the outer panel of the opening and closing body, by setting properly the contents of the respective reinforcing fiber and rubber components, it is made possible to improve the rigidity of the member by increasing the modulus of bend elasticity by blending reinforcing fiber, without particularly deteriorating the moldability of the material resin and the appearance of the molded product and to reliably give impact resistance by blending the rubber component. That is, it is made possible to obtain an interior member having good moldability and good appearance as a molded product and provided with a required rigidity and impact resistance. Further, since molding is carried out by the injection molding method, even if it is required to form a hole part in the molded product, the requirement can be satisfied generally by properly designing the die and thus any post-processing (drilling after molding) is made unnecessary. That is, as compared with a conventional case of a press-molding method, the method can eliminate troublesome secondary processing such as the drilling after the molding or burr removal and thus the processing steps can be decreased to save the time and the labor taken for the production.

Furthermore, according to the second aspect of the invention, with respect to the opening and closing body of which the outer panel is made of the resin, basically the same effects as those of the first aspect of the invention can be achieved and further, use of polypropylene type resin containing the reinforcing fiber and the resin material containing rubber as the above-mentioned molding material makes the setting of the respective components of the reinforcing fiber and the rubber component relatively easy and reliable.

Furthermore, according to the third aspect of the invention, basically the same effects as those of the first or the second aspect of the invention can be achieved. Particularly, the blending ratio by weight of the reinforcing fiber, the polypropylene type resin, and the rubber of the above-mentioned molding material is set to be (20 to 50):(30 to 75):(5 to 20). A prescribed modulus of bend elasticity is assured and at the same time deterioration of the appearance is prevented owing to the adjustment of the blending ratio by weigh of the reinforcing fiber to be 20 to 50%, further a prescribed impact resistance is assured and at the same time decrease of the moldability is prevented Furthermore, according to the fourth aspect of the invention, basically the same effects as those of the second or the third aspect of the invention can be achieved. Particularly, since the modulus of bend elasticity of the inner member is set to be equal to or higher than that of the outer panel made of the resin, even if the rigidity of the outer panel is insufficient, the insufficient rigidity is compensated by the interior member and accordingly a prescribed rigidity as the opening and closing body can be assured.

Furthermore, according to the fifth aspect of the invention, basically the same effects as those of any one of the first to the fourth aspects of the invention can be achieved. Particularly, since the modulus of bend elasticity is 4,000 MPa or higher, even in the case the outer panel made of the resin is produced by using a resin material including PC (polycarbonate) resin and ABS (acrylonitrile-butadiene-styrene) resin which is relatively common as a resin material for a panel material of an automobile as raw materials and having rigidity of about 3,500 to 3,800 MPa on the basis of modulus of bend elasticity, which is not necessarily sufficient for the outer panel of the opening and closing body of an automobile, the insufficiency is compensated by the high modulus of bend elasticity of the interior member and the rigidity of the opening and closing body can reliably be heightened and a prescribed rigidity can be obtained.

Furthermore, according to the sixth aspect of the invention, basically the same effects as those of any one of the first to the fifth aspects of the invention can be achieved. Particularly, in the case a rectangular shape circumscribed to the interior member in a front view is assumed, a thin part is provided in the periphery of the end portion of the interior member in a direction along a predetermined side of the rectangular shape while being extended approximately in parallel to either an other side of the rectangular shape crossing the predetermined side or the outer circumferential line of the interior member extended in approximately the same direction of another side. And, the gap size of the molding cavity is made small in a portion of the molding die corresponding to the thin part. Accordingly, it becomes difficult for the melt resin to flow in the extended direction of the thin part (that is, in the direction approximately in parallel to either one direction of another side of the rectangular shape or the outer circumferential line). Consequently, the melted resin is hindered from flowing in the prescribed direction approximately in parallel to either the predetermined side of the rectangular shape or the direction approximately parallel to the outer circumferential line of the interior member extended in the same direction as the predetermined side and thus unevenly high distribution of fiber orientation degree in the specified direction can be effectively suppressed. As a result, rather significant warping and deformation of the interior member can be prevented from occurring in the approximately center part in the specified direction. In this case, if the side circumscribed to the outer circumferential line where the deformation of the interior member is most easily caused is selected as the predetermined side of the above-mentioned rectangular shape, occurrence of the deformation of the interior member is extremely effectively suppressed.

Furthermore, according to the seventh aspect of the invention, basically the same effects as those of any one of the first to the fifth aspects of the invention can be achieved. Particularly, the thick part is provided in the periphery of the end portion of the interior member in a direction along another side of the above rectangular shape while being extended approximately in parallel to either the predetermined side of the rectangular shape or the direction approximately parallel to the outer circumferential line of the interior member extended in the same direction as the predetermined side. And, thus the molding cavity corresponding to the thick part in the molding die works as a resin pool. And with respect to the end portion of the interior member in the direction along with another side of the above-mentioned rectangular shape, the filling amount and the filling speed of the melted resin injected from a plurality of directions can be made relatively even. And thus unevenly high distribution of fiber orientation degree in a specified direction parallel to either another side of the above-mentioned rectangular shape and the outer circumferential line of the interior member can be suppressed. As a result, rather significant warping and, deformation of the interior member can be prevented from occurring in the approximately center part in the specified direction. In this case, if the side circumscribed to the outer circumferential line where the deformation of the inner member is most easily caused is selected as the predetermined side of the above-mentioned rectangular shape, occurrence of the deformation of the interior member is extremely effectively suppressed.

Furthermore, according to the eighth aspect of the invention, particularly, with respect to an inner member having an opening for a window such as an inner member for a door or a tail gate of, for example, an automobile, basically the same effects as those of the sixth or the seventh aspect of the invention can be achieved.

According to the ninth aspect of the invention, since the thick cavity part with a large gap size formed between the terminal cavity part and the gate cavity part works a resin pool. And, the resin material injected from the gate flows in the above-mentioned thick cavity part (the resin pool) from the above-mentioned gate cavity part and then flows in the above-mentioned terminal cavity part. Accordingly, the filling amount and the filling speed of the melted resin injected from a plurality of directions can be made relatively even in the terminal cavity part and thus unevenly high distribution of fiber orientation degree in a specified direction along with the above terminal cavity part can be suppressed. As a result, rather significant warping and deformation of the interior member can be prevented from occurring in the approximately center part of the interior member in the specified direction.

According to the tenth aspect of the invention, in the periphery of the terminal part of the inner member, the thick cavity part corresponding to the thick part set in approximately parallel to the terminal part works a resin pool. And the resin material injected from the gate to the inside of the molding die flows in the above-mentioned thick cavity part (the resin pool) and then flows in the above-mentioned terminal cavity part. Accordingly, the filling amount and the filling speed of the melted resin injected from a plurality of directions can be made relatively even in the terminal cavity part. And thus unevenly high distribution of fiber orientation degree in a specified direction along with the above terminal cavity part can be suppressed. As a result, rather significant warping and deformation of the interior member can be prevented from occurring in the approximately center part of the interior member in the specified direction.

According to the eleventh aspect of the invention, with respect to the fiber-containing resin material injected from the gate to the inside of the molding die, the fiber is prevented from orientation in the same direction as the above mentioned outer circumferential line in the molding cavity corresponding to the outer circumferential line of the interior member. And thus unevenly high distribution of fiber orientation degree in a specified direction along with the molding cavity corresponding to the outer circumferential line of the interior member can be suppressed. As a result, rather significant warping and deformation of the interior member can be prevented from occurring in the approximately center part of the interior member in the specified direction.

DESCRIPTION OF THE PREFERRED EMBODIMENTS

Figure 1:
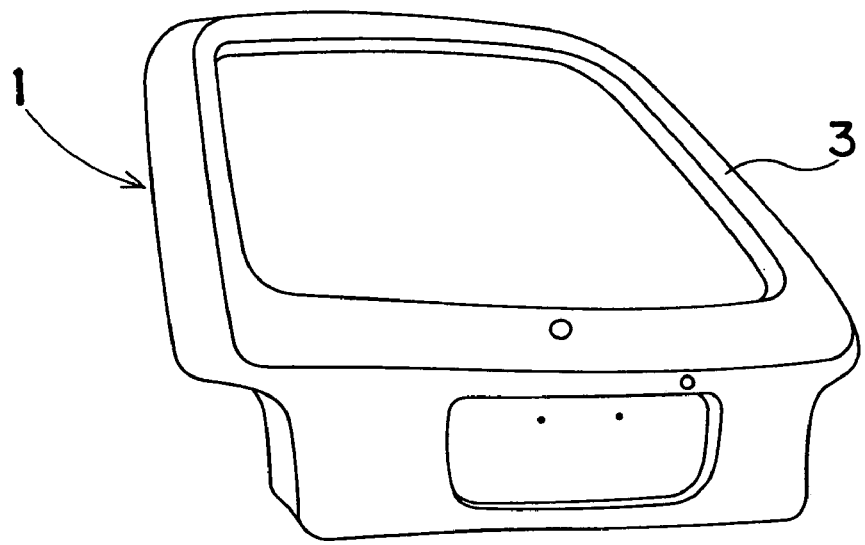
FIG. 1 is a perspective view of a tail gate attached to a rear part of a body of an automobile according to an embodiment of the invention.
Figure 2:
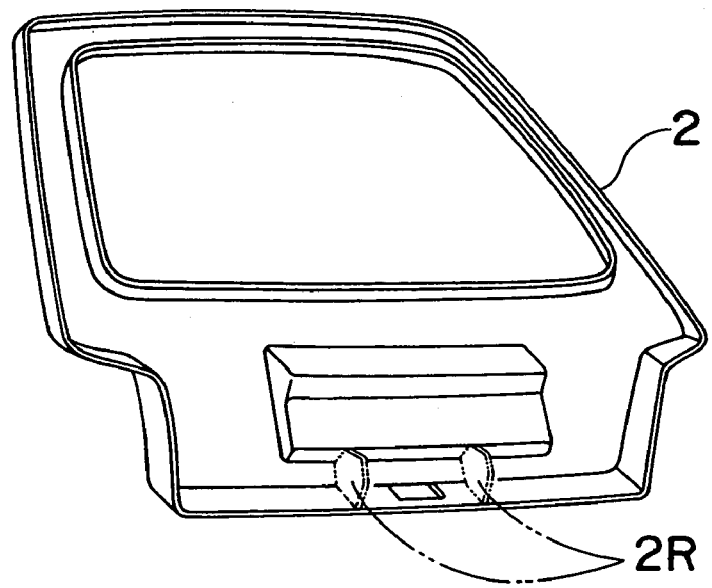
FIG. 2 is a perspective view of an inner panel of the above-mentioned tail gate.

Hereinafter, embodiments of the invention will be described in details with reference to attached drawings by exemplifying the application of the invention to an interior member for a tail gate of an automobile. FIG. 1 is a perspective view of the tail gate to be attached to a rear part of a body of the automobile according to one embodiment of the invention before assembly of a window glass, and FIG. 2 is a perspective view of an inner panel of the tail gate.

The above-mentioned tail gate 1 is to be attached to the rear part of an automobile as an opening and closing body to cover an opening part formed in the rear part of the automotive body in a closeable manner. It is formed by combining an inner member 2 (an inner panel) and an outer member 3 (an outer panel) with prescribed shapes and sizes and joining circumferential rim parts and the vicinity thereof of both panels 2, 3 so as to keep a prescribed space part between the both panels 2, 3.

Incidentally, actually, a large number of rib parts 2R (only some of them are shown with the virtual lines in FIG. 2) are formed on the inner panel 2. The rib parts are thin as compared with the base part of the inner panel 2 and have complicated shapes, so that they are parts most difficult to be molded among the respective parts of the inner panel 2 in the case of resin molding. The thickness and the height of the rib parts 2R are set to be 2 mm and 40 to 50 mm, respectively.

In this embodiment of the invention, both of the above-mentioned inner and outer panels 2 and 3 are produced by molding synthetic resin and the circumferential rim parts and the vicinity thereof are joined by using, for example, an adhesive.

A synthetic resin material for the above-mentioned outer panel 3 is preferable to have a linear expansion coefficient (measurement standard: JIS K 7197) $8\times10^{-5}/°$ C. or lower, particularly $5\times10^{-5}/°$ C. or lower and examples usable for the synthetic resin material are a composite of PC (polycarbonate) resin and ABS (acrylonitrile-butadiene-styrene) resin, a composite of polyamide resin and glass fiber, and a composite of polypropylene resin and glass fiber and the like. In this case, in consideration of the surface property and the coatability of the final tail gate, a resin material (linear expansion coefficient: $4\times10^{-5}/°$ C.) using the PC resin and ABS resin as raw material is used. If the linear expansion coefficient of the outer panel 3 exceeds $8\times10^{-5}/°$ C., the deformation and strain may possibly be significant depending on the environments for the use.

The difference of the linear expansion coefficients of the resin for the outer panel and the resin for the interior member (the linear expansion coefficient of the resin for the outer panel—the linear expansion coefficients of the resin for the interior member) is preferably $6\times10^{-5}/°$ C. or lower and particularly (the linear expansion coefficient of the resin for the outer panel—the linear expansion coefficients of the resin for the interior member) is more preferably 0 to $3\times10^{-5}/°$ C. or lower. If the difference of the linear expansion coefficient between both resins exceeds $6\times10^{-5}/°$ C., depending on the use environments, the strains become significant in the joining parts of the interior member and the outer panel and the deformation, corrugation (so-called Mera), interference (contact) with an automotive body and the like are caused and also, the rigidity and the appearance of the entire tail gate are possibly deteriorated.

Use of the resin material (PC/ABS) of the outer panel 3 makes it possible to obtain a molded product having specular gloss and good surface property, accordingly such a material is preferable as a molding material for a product just like an outer panel 3 of a tail gate 1 which is to be coated with paint after the molding. However, the rigidity is about 3,500 to 3,800 MPa on the basis of modulus of bend elasticity, which is not necessarily sufficient for the outer panel 3 of the tail gate 1 of an automobile.

In this case, if the rigidity of the inner panel 2 is only as high as that of the outer panel 3, it is difficult to stably obtain a rigidity needed as the tail gate 1 and in some cases, the rigidity of the tail gate 1 itself becomes insufficient. Therefore, in this embodiment, the inner panel 2 is provided with a high rigidity (in other words, a higher rigidity than that of the outer panel 3) so as to obtain the rigidity needed as the tail gate 1.

More particularly, as a resin material for the inner panel 2, basically aiming to obtain a modulus of bend elasticity of 4,000 MPa or higher which is higher than that of a present material (PC resin+ABS resin) for the outer panel 3, various investigations have been carried out and tests have been repeated.

It has been confirmed that the rigidity of the tail gate 1 is reliably increased by adjusting the modulus of bend elasticity of the material resin of the inner panel 2 to be 4,000 MPa or higher. And, especially in the case the modulus of bend elasticity is 6,000 MPa or higher, it is assured to highly stably obtain the rigidity required for the tail gate. Further, in this case, the moldability as the resin material and appearance and the impact resistance of the molded product have to be at lowest the same levels as those of current material.

The resin material of the above-mentioned inner panel 2 is preferable to have the linear expansion coefficient (measurement standard: JIS K 7197) of $4\times10^{-5}/°$ C. or lower. If the linear expansion coefficient of the resin material for the inner panel 2 exceeds $4\times10^{-5}/°$ C., the rigidity of the inner panel 2 is accordingly decreased or the deformation and strain may possibly become significant depending on the use environments. The resin material of the above-mentioned inner panel 2 is further preferably to have the linear expansion coefficient of $3\times10^{-5}/°$ C. or lower. For example, among test pieces used for a dropping impact test, which will be described later, the linear expansion coefficient was found to be $2.5\times10^{-5}/°$ C. for the resin material of the test piece No. 4 (reference to Table 2 shown later).

In this embodiment, to save secondary processing and to obtain a resin material having a modulus of bend elasticity of 4,000 MPa or higher in form of the molded product without deteriorating the moldability as the resin material and the appearance and impact resistance of the molded product, tests for investigating the modulus of bend elasticity of the molded product, the moldability, the impact resistance, and the appearance are carried out by using resin materials including block polypropylene resin containing mainly polypropylene type resin which is relatively common as a resin material for a panel material for an automobile, a reinforcing fiber blended together, and rubber added thereto and molding the resin materials with varied reinforcing fiber and rubber blending ratios.

To explain in details of the above-mentioned resin materials, the above-mentioned polypropylene based resin includes modified polypropylene resin obtained by adding modified polypropylene resin in an amount of preferably 0.1 to 5% by weight and more preferably 1 to 4% by weight in the total of the polypropylene resin, rubber and reinforcing fiber.

Hereinafter, the respective tests carried out to obtain the material resin for molding the inner panel 2 for the tail gate of an automobile will be described.

Table 1 collectively shows the test results of the investigations of the modulus of bend elasticity, moldability, impact resistance, and appearance of injection-molded products obtained by injection molding materials of block PP (polypropylene) with which the blending ratios of the reinforcing fiber and rubber are variously changed. The numerical values other than the GF content (%) and the EBR amount (%) in the Table 1 are the modulus of bend elasticity values (MPa) obtained in the respective conditions.

TABLE 1

Modulus of bend elasticity of GF/PP (MPa)

| EBR amount | GF content | | | | | | | | | fluidity and moldability | impact resistance |
|---|---|---|---|---|---|---|---|---|---|---|---|
| | 15% | 20% | 25% | 30% | 35% | 40% | 45% | 50% | 55% | | |
| 0% | 3540 | 4320 | 5100 | 5990 | 6830 | 7660 | 8500 | 9500 | 10500 | ○ | X |
| 5% | 3300 | 4000 | 4420 | 5310 | 6150 | 7200 | 7810 | 8810 | 9810 | ○ | ○ |
| 10% | 2800 | 3400 | 4010 | 4630 | 5470 | 6740 | 7120 | 8120 | 9120 | ○ | ○ |
| 15% | 2500 | 2800 | 3200 | 4050 | 4800 | 6320 | 6620 | 7670 | 8430 | ○ | ○ |
| 20% | 1900 | 2100 | 2380 | 3270 | 4120 | 5800 | 6120 | 7170 | 7740 | ○ | ○ |
| 25% | 1500 | 1860 | 2180 | 2590 | 3440 | 5120 | 5620 | 6670 | 7050 | X | ○ |
| appearance (glass sinking and floating) | ○ | ○ | ○ | ○ | ○ | ○ | ○ | Δ | X | | |

In the series of the tests, glass fiber is used as the reinforcing fiber to be added to the block PP resin and the addition rubber component is ethylene-butadiene rubber (EBR). Particularly, with respect to the reinforcing fiber, a long fiber of roving glass with a diameter of 13 to 20 μm is added in respectively specified weight ratios to a matrix resin (PP type resin) and the resulting resin materials containing glass-reinforced fiber (GF) with a length 1.5 to 13 mm in the various GF blending ratios are extrusion-molded. Practically, pellets obtained by impregnating the reinforcing fiber with block polypropylene resin and modified polypropylene resin are used. At the time of producing the pellets for molding actual products, in order to obtain better appearance, it is preferable to add a coloring material in about several %.

Also, with respect to the rubber component, PP resin pellets with. various rubber blending ratios are molded by blending respectively prescribed blending ratios by weight of EBR with the matrix resin (PP resin) and extrusion-molding the resulting PP resin blends.

The combinations of pellets to be used for molding are variously changed and selected: practically, the contents of the glass reinforcing fiber (GF) are changed in a range of 15 to 55% by weight and the contents of the rubber component (EBR) are changed in a range of 0 to 25%: to obtain molded product samples with different blending ratios by weight of reinforcing fiber (GF), the matrix resin (block PP resin), and the rubber (EBR).

Practically, the PP resin pellets containing GF and PP resin pallets containing EBR are loaded to an injection molding apparatus and the resin materials obtained by kneading and melting them in the apparatus are injected to a prescribed die to obtain samples.

In this case, since the resin materials to be kneaded in a kneader contain rubber (EBR), the break of the glass fiber (GF) is suppressed to extremely low. Accordingly, without using a special kneader, kneading can be carried out well by a commonly used kneader.

Since molding is carried out by an injection molding method, even if it is required to form a hole part in a molded product, in general, the requirement can be satisfied by properly designing the die and accordingly the post-processing (drilling a hole after the molding) is made not need. That is, as compared with the case of employing a press molding method, troublesome secondary processing such as drilling a hole after molding or removing resulting burr can be eliminated and accordingly the number of production steps can be lessened and time and labor required for the production can be saved.

With respect to the respectively molded product samples obtained in the above-mentioned manner, the appearance of the surface is evaluated by eye observation inspection. That is, if a large number of recessions and projections (glass sinking and floating to the surface) owing to the glass fiber are formed in the surface of a molded product sample (marked with x in the Table 1) and if some are formed (marked with Δ), they are determined to be unqualified ones and if no glass exposure is observed by eye observation (marked with ○), they are determined to be qualified ones.

Further, rib parts which are most difficult to be molded among the respective molded product samples are observed with eyes and in the case rib parts are found defective as short shot, it means the fluidity of the material resins is insufficient and no sufficient moldability is obtained and therefore, they are determined to be unqualified ones (marked with x) and in the case no rib defect of short shot is observed (marked with ○), it is considered the fluidity of the resins is utterly satisfactory and therefore, they are determined to be qualified ones.

On completion of the above-mentioned tests (the appearance test and the moldability test) by mainly eye observation, test pieces are cut out of the respectively molded product samples and subjected to an impact test. As the impact test, so-called a dropping impact test is carried out by dropping an iron ball with a prescribed size and weight from a prescribed height to a test piece (natural dropping with zero initial acceleration) to evaluate the impact resistance based on occurrence of cracking in the test piece.

The test piece has a square plate-shape with a size and thickness of 150 mm×150 mm×3 mm. The size and weight of the iron ball to be dropped are adjusted to be 50 mm diameter and 3.8 kg, respectively.

In this embodiment, test pieces with a glass reinforcing fiber (GF) of 40% by weight and a content of ethylene -butadiene rubber (EBR) in a range of 0 to 25% by weight are subjected to the dropping impact test. The test results are shown in Table 2.

As described above, among the test pieces subjected to the dropping impact test, the resin material for No. 4 has a linear expansion coefficient of $2.5 \times 10^{-5}/°$ C.

TABLE 2

| dropping impact test: Test piece No. | | | | | |
|---|---|---|---|---|---|
| 1 | 2 | 3 | 4 | 5 | 6 |
| GF 40% | GF 40% | GF 40% | GF 40% | GF 40% | GF 40% |
| EBR 0% | EBR 5% | EBR 10% | EBR 15% | EBR 20% | EBR 25% |
| 20 cm cracked | 95 cm cracked | 100 cm cracked | 100 cm cracked | 150 cm cracked | 200 cm or higher |
| NG | OK | OK | OK | OK | OK |

To compare with the test results of the above-mentioned test pieces, test pieces produced respectively by press-molding a PP resin sheet material containing a glass mat (Comparative Example 1), molding resin materials including polypropylene (PP) resin and 40% by weight of glass reinforcing fiber (GF) (Comparative Examples 2 and 3), and molding a material obtained by blending a polyamide (PA) resin with 40% by weight of glass reinforcing fiber (Comparative Example 4) are subjected to the dropping impact test. The test results of the Comparative Examples are shown in Table 3.

TABLE 3

| dropping impact test: Comparative Examples | | | |
|---|---|---|---|
| 1 | 2 | 3 | 4 |
| GMT (GF 40%) | PP/GF (GF 40%) | PP/GF (GF 40%) | PA/GF (GF 40%) |
| 95 cm cracked (standard value) | 20 cm cracked NG | 15 cm cracked NG | 50 cm cracked NG |

As being understood from the test results of Table 3, among Comparative Examples 1 to 4, a presently commercialized product, which is a conventional product, produced by press-molding the PP resin sheet material containing a glass mat (Comparative Example 1) shows highest evaluation value in the dropping impact test and the value is 95 cm. That is, in the case of Comparative Example 1, no cracking occurs until the dripping height of the iron ball reaches 95 cm and at that height, the sample is cracked. It is required to have the impact resistance at least equivalent to the evaluation value 95 cm of the conventional product (Comparative Example 1) or higher, and for that, in this test those which have values less than the value (95 cm) of the dropping height are determined to be unqualified ones (marked with x). The evaluation results of the dropping impact test in the embodiments of the invention are shown in the item, "impact resistance" of Table 1.

Further, test pieces are cut out of the respectively molded samples and subjected to a bending test to measure the modulus of bend elasticity of the respective test pieces. As the modulus of bend elasticity, as described above, the criterion of the qualification judgment is determined to be 4,000 MPa or higher, which is a sufficient value to give a modulus of bend elasticity higher than that of a presently used material (PC resin+ABS resin) of an outer panel 3 and reliably increase the rigidity of a tail gate 1.

As being understood from the test results shown in Table 1, as the content of the glass reinforcing fiber (GF) is increased more, the modulus of bend elasticity is heightened more and the rigidity is improved more. And, on the other hand, if the GF content reaches 50%, a few of recessions and projections owing to the glass fiber (glass sinking and floating to the surface) are caused in the surface of the molded product samples (refer to Δ mark in Table 1), and if the GF content reaches 55%, a large number of such recessions and projections are formed (refer to x mark in Table 1). Accordingly, in terms of the assurance of good appearance, the upper limit of the GF content is set to be 50%.

Meanwhile, to assure the modulus of bend elasticity of 4,000 MPa or higher, it is required to contain 20% or more by weight of GF (refer to Table 1), the lower limit of the GF content is set to be 20% by weight.

With respect to the ethylene-butadiene rubber (EBR) amount, as the content is increased more, the dropping impact value is increased more (refer to Table 2) and the impact resistance is improved more, however if the content reaches 25% by weight, the fluidity of the resin material is decreased when the material is melted and kneaded and injected to decrease the moldability. Accordingly, in terms of assurance of the moldability, the upper limit value of the EBR amount is set to be 20% by weight.

Meanwhile, with respect to the lower limit value of the EBR amount, if it is 5% by weight or more, the evaluation value in the dropping impact test is 95 cm or more (refer to test pieces 2 to 6 in Table 2) and if no EBR is contained, the evaluation value is 20 cm that means "impact resistance" is unqualified (refer to test piece 1 in Table 2). Accordingly, in terms of assurance of the impact resistance, the lower limit of the EBR amount is set to be 5% by weight.

As described above, in the case of molding the inner panel 2 of the above-mentioned tail gate 1, it is found that as a resin material which does not require secondary processing and has a modulus of bend elasticity of 4,000 MPa or higher in form of the molded product without deteriorating the moldability as the resin material and the appearance and impact resistance of the molded product, the resin material preferably includes block polypropylene resin containing mainly polypropylene type resin (PP), which has commonly been used as a resin material for a panel material for an automobile, a reinforcing fiber blended together, and rubber added thereto in blending ratio by weight of the reinforcing fiber, the block PP resin, and the rubber in the molding material is (20 to 50):(30 to 75):(5 to 20).

Although in the above-mentioned embodiment, ethylene-butadiene rubber is used as the rubber component, the rubber component is preferably a thermoplastic elastomer and, for example, a material containing 10% by weight of ethylene-1 butene copolymer elastomer (EBR) and 2% by weight of styrene-ethylene-butylene-styrene copolymer elastomer (SEBS) may be used.

Examples of usable thermoplastic elastomers to be added to the fiber-reinforced polypropylene material for the resin-made interior member for the opening and closing body of the invention may include olefin type elastomers such as ethylene-propylene copolymer elastomer (EPR), ethylene-1 butene copolymer elastomer (EBR), ethylene-1 octene copolymer elastomer (EOR), and ethylene-propylene-1 butene copolymer elastomer (EPDM); styrene type elastomers such as styrene-butadiene copolymer elastomer, styrene-isoprene copolymer elastomer, and styrene-butadiene-isoprene copolymer elastomer; or styrene-ethylene-butylene-styrene copolymer elastomer (SEBS) and styrene-ethylene-propylene-styrene copolymer elastomer (SEPS) obtained by completely or partially hydrogenation of these copolymers. The above-mentioned thermoplastic elastomers may be used alone and two or more of them may be mixed.

As the reinforcing fiber, carbon fiber may be used in place of the glass reinforcing fiber.

As the resin material, it is not limited to the block PP resin mainly containing the above-mentioned PP type resin including modified polypropylene resin and PP type resins including one or a plurality of types of PP resins such as homo PP resin, block PP resin, random PP resin, and modified PP resin may be used.

In the case of producing a molded product with a relatively large size and extended approximately in a plane just like an inner panel for the tail gate of an automobile by molding a resin, it is generally known difficult to keep good balance of shrinkage in the respective parts and in the respective directions at the time of solidification of the melted resin packed in a molding die and it is thus easy to cause deformation such as warping. Particularly, in the case of using a resin material mixed with a reinforcing fiber, the fiber orientation and its degree of the reinforcing fiber differ in the respective parts and in the respective directions, and attributed to the difference of the shrinkage caused accordingly, it occurs a problem that deformation, e.g. warping is easily caused in the resulting molded product.

In the following embodiment, a variety of tests are carried out for suppressing such deformation of molded products. Next, the deformation suppression test will be described. In this test, same molding materials as those used for the above-mentioned tests for the modulus of bend elasticity, moldability, impact resistance, and appearance are used.

Figure 3:
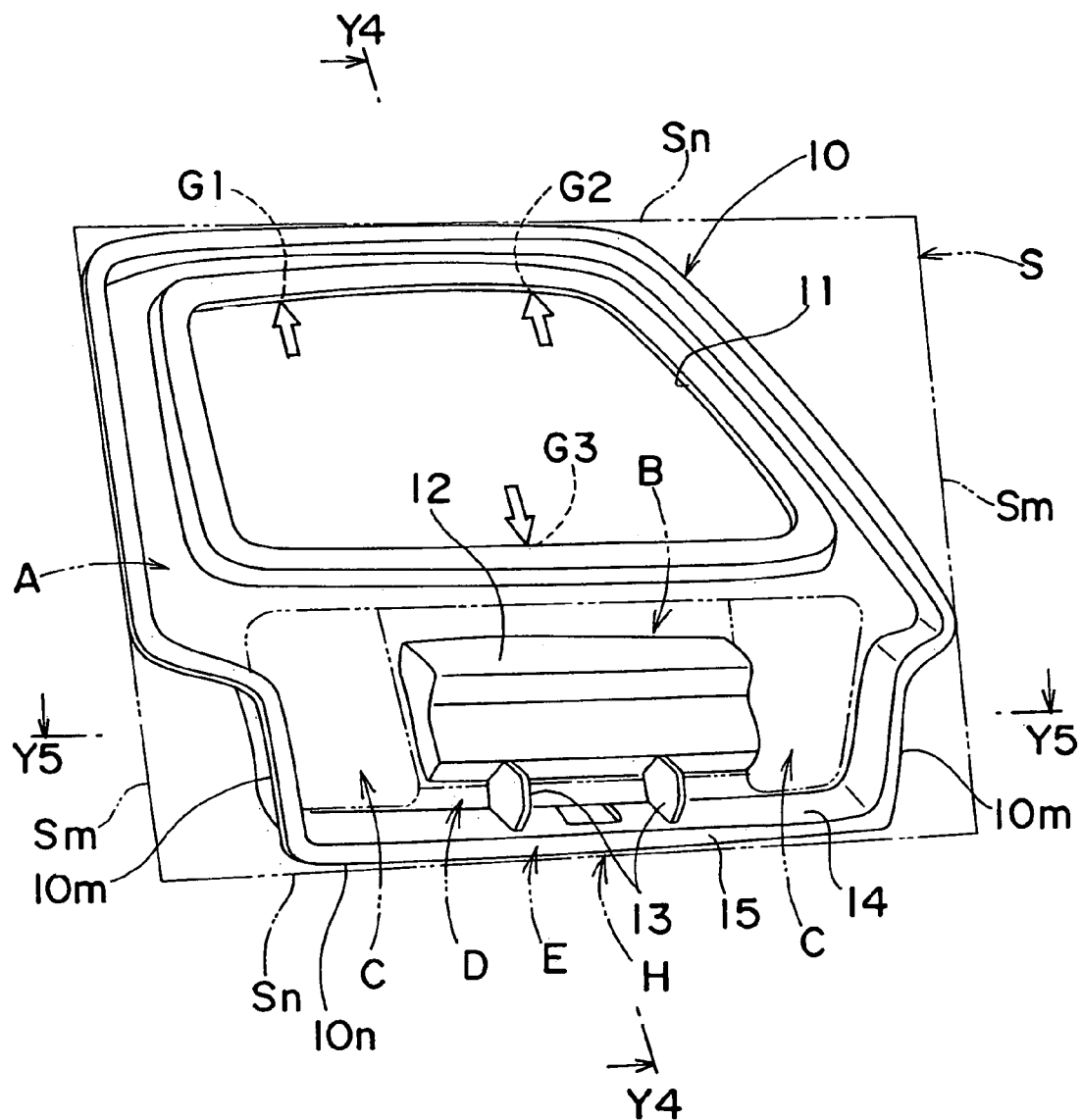
FIG. 3 is a perspective view of an inner panel for a tail gate employed for a deformation suppression test.
Figure 4:
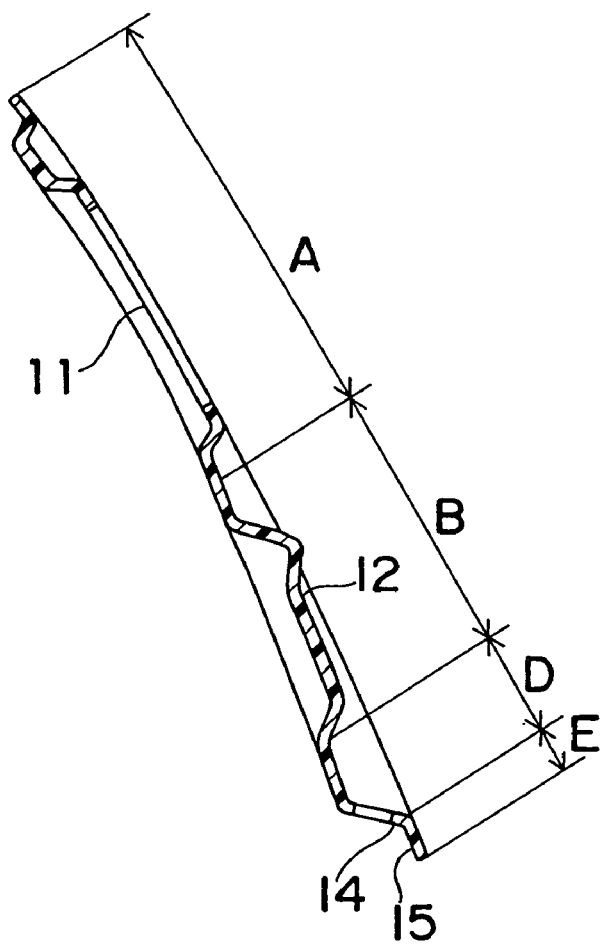
FIG. 4 is an explanatory cross sectional drawing of the inner panel taken along an Y4-Y4 line in FIG. 3.
Figure 5:
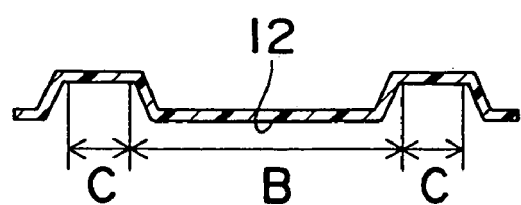
FIG. 5 is an explanatory cross sectional drawing of the inner panel taken along an Y5-Y5 line in FIG. 3.
Figure 6:
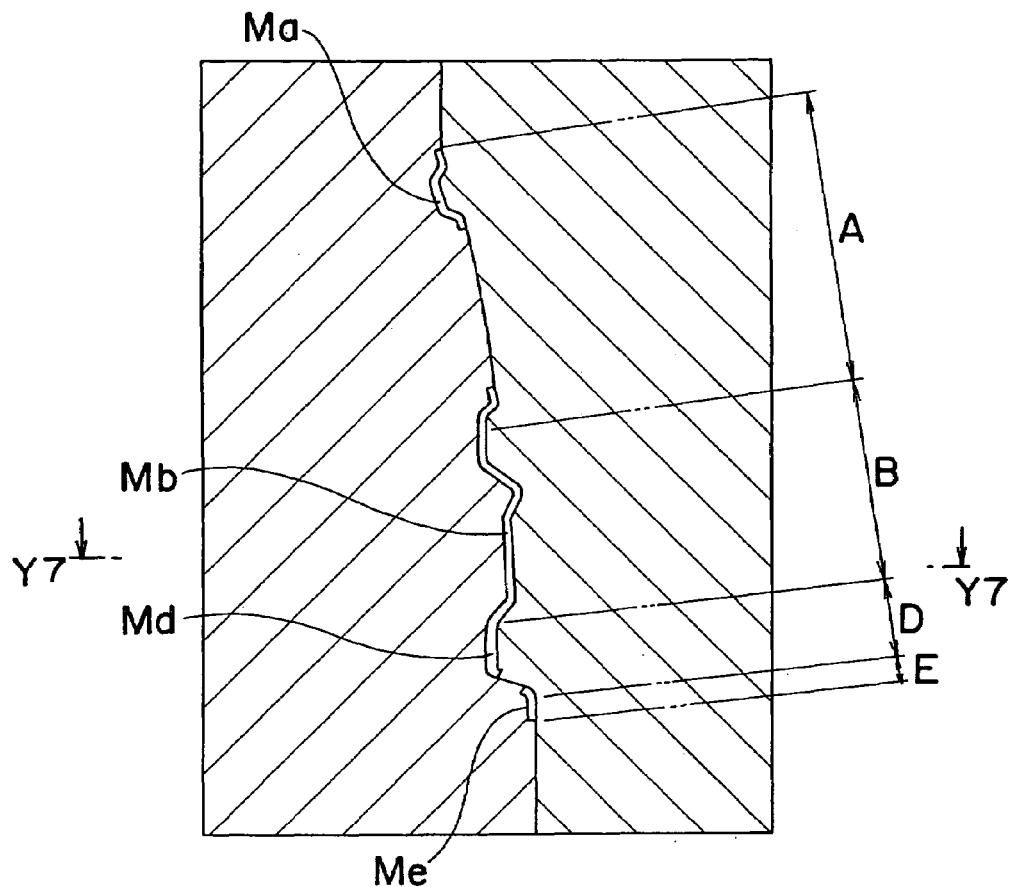
FIG. 6 is an explanatory cross sectional drawing of a part of molding die for the inner panel corresponding to the cross-sectional part of a molded body in FIG. 4.
Figure 7:
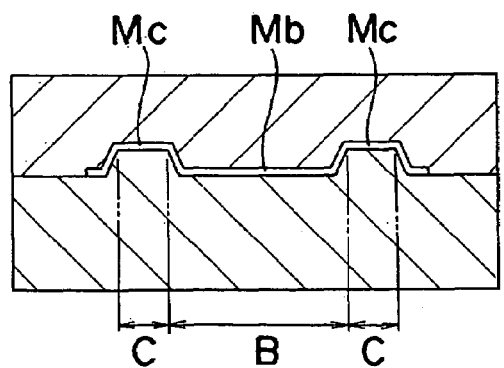
FIG. 7 is an explanatory cross sectional drawing of the molding die taken along an Y7-Y7 line in FIG. 6.

FIG. 3 is a perspective view of an inner panel 10 of a tail gate employed for the deformation suppression test. FIG. 4 and FIG. 5 are explanatory cross sectional drawings of inner panel 10 taken along the Y4-Y4 line and the Y5-Y5 line in FIG. 3, respectively. FIG. 6 is an explanatory drawing showing a molding die for the inner panel, and is an explanatory cross sectional drawing of a part of the molding die corresponding to the cross-sectional part of the molded body in FIG. 4. Also, FIG. 7 is an explanatory drawing showing a part of the molding die corresponding to the cross-sectional part of the molded body in FIG. 4, and is an explanatory cross sectional drawing taken along the Y7-Y7 line in FIG. 6.

The inner panel 10 has a basically same shape of the inner panel 2 shown in FIG. 2, a large opening part 11 for a window is formed in the upper part in the front view and an expanded part 12 corresponding to an installation part of a number plate is formed under it. Reinforcing ribs 13 are formed so as to join the lower end part of the inner panel and the expanded part 12.

In this test, at the time of injection molding of the above-mentioned inner panel 10, a plurality of (e.g. three) gates G1, G2, and G3 are formed in a molding die, corresponding to the peripheries of the inner circumference of the opening part 11 for a window and the melted resin is injected and packed in the molding cavity from these gates G1, G2, and G3. The gates G1 and G2 formed in both right and left side positions corresponding to the peripheries of the upper side inner circumference -of the opening part 11 for a window are for injecting the melted resin to the molding cavity mainly corresponding to the upper part and right and left side parts of the inner panel 10. And, the gate G3 formed approximately in the center corresponding to the periphery of the lower side inner circumference of the opening part 11 for a window is for injecting the melted resin to the molding cavity mainly corresponding to the lower part of the inner panel 10.

Further, in this test, the inner panel 10 is virtually divided into some sections as described below and the flow of the melted resin and deformation in the respective sections of the inner panel 10 are investigated:

A section: regions just like frames surrounding the circumference of the above-mentioned opening part 11 for a window and the entire body of the inner panel 10, in other words, the region except the following B to C regions:

B section: a region positioned in the center part under the above-mentioned A section and mainly covering the above-mentioned expanded part 12 in the center of the lower part of the inner panel:

C section: a substantially flat region positioned under the A section and in both right and left sides of the B section:

D section: a region composed of the region under the B section and the lower end face 14 of the inner panel 10: and E section: a region composed of the rear end flange 15 of the lower end face 14 of the inner panel.

To investigate the flow of the melted resin and deformation in the respective sections of the inner panel 10, a rectangular shape S circumscribed to the inner panel 10 in the front view is set virtually. In the case of the test, the rectangular shape S is a rectangle with a slightly longer transverse length.

In the test, three samples with variously changed thickness of the respective sections of the above five sections A to E are preset and molding dies corresponding to the respective samples are made ready and injection molding is carried out using the molding dies to investigate the deformation state of the respective samples. In this investigation of the deformation state, with respect to the approximately center part in the lower end side of the inner panel 10, which is a portion to be deformed most (H portion in FIG. 3), the deformation degree (the warping) is measured.

FIG. 6 and FIG. 7 show one examples of molding dies M1 and M2 and the gap size of the molding cavities Ma to Me corresponding to the respective sections A to E are changed, so that the thickness of the respective portions of the inner panel 10 can be changed.

The preset thickness of the respective sections and measured values of the deformation amounts of the above-mentioned portion H of three samples 1, 2, and 3 are shown in Table 4.

TABLE 4

| | thickness of respective sections | | | | | (unit mm) |
| --- | --- | --- | --- | --- | --- | --- |
| | Section A | Section B | Section C | Section D | Section E | Deformation amount |
| Sample 1 | 3.5 | 2.7 | 3.5 | 2.7 | 3.5 | 14.5 |
| Sample 2 | 3.5 | 3.5 | 2.5 | 2.7 | 3.5 | 6.9 |
| Sample 3 | 3.5 | 3.5 | 2.5 | 4.5 | 3.0 | 3.3 |

Figure 9:
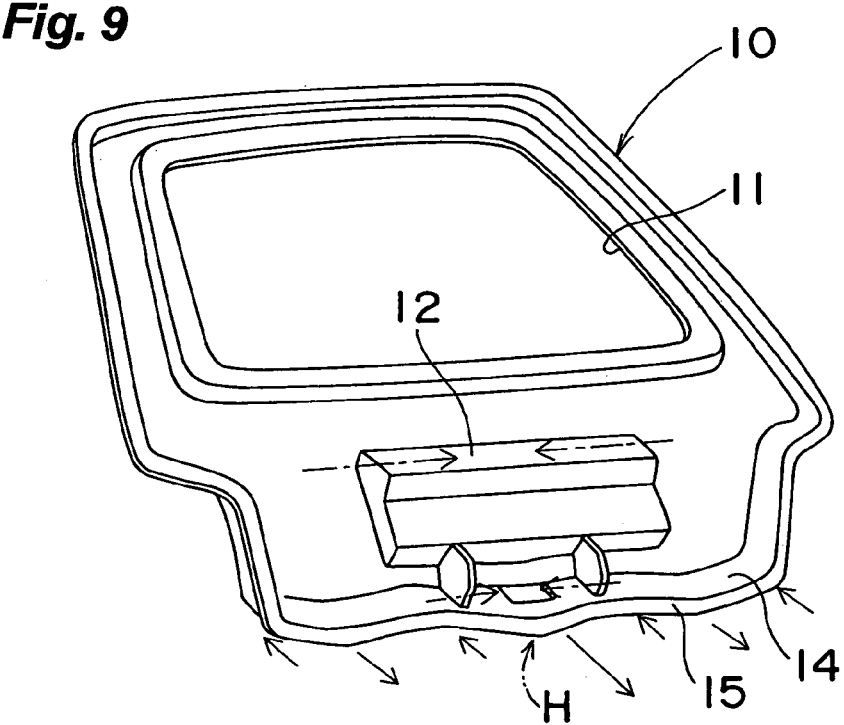
FIG. 9 is a perspective view schematically showing an inner panel in a deformed state in the above-mentioned sample 1.

The sample 1 has a thickness preset to be most standard and in this case, as shown in FIG. 9, in the lower end part of the inner panel 10, an extremely significant warp (deformation) is caused so as to expand in the approximately center part (the H portion) along the outer circumferential line from the surface, that is, so as to protrude toward the rear side in the case of installation in an automotive body.

Figure 8:
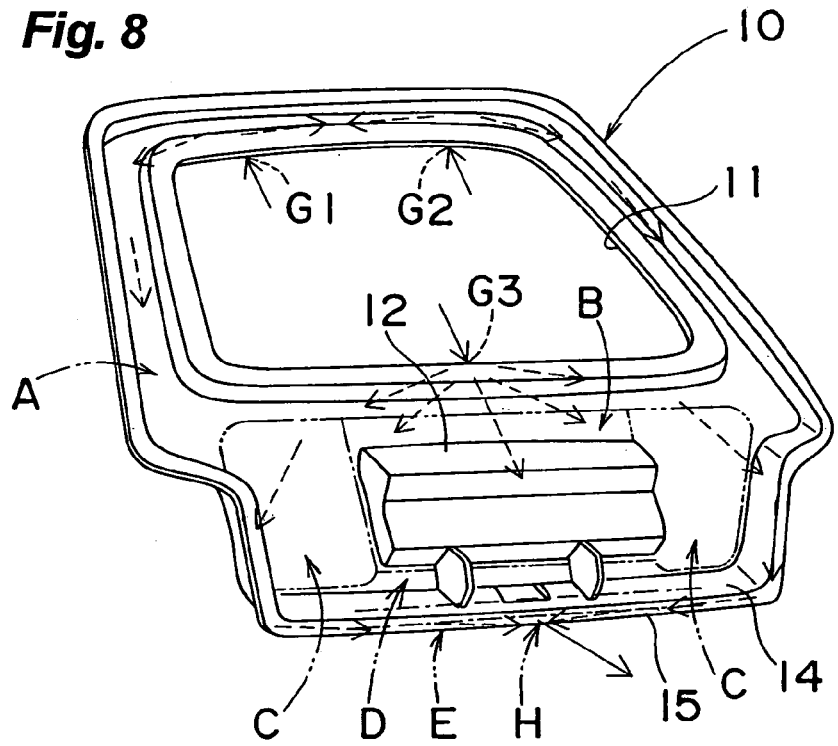
FIG. 8 is a perspective view of an inner panel schematically showing a flow of a melted resin in a sample 1 of the above-mentioned deformation suppression test.

That is, as shown in FIG. 8, in the lower end part of the inner panel and the vicinity thereof, which is an end part relatively remote from the gates G1 to G3, and its vicinity, the resin current flowing along the side rim part of the section A to be packed in the direction along the outer circumferential line of the section E and the resin current to be packed in the direction approximately rectangular to the outer circumferential line of the section E are led to fill the molding cavity Me with the melted resin. And, since there is an expanded part 12 in the center region of the inner panel 10 and also the thickness of the section B including the expanded part 12 and the section D under the section B is set thin and reinforcing ribs 13, 13 are formed from the section B to the section D, the flow rate of the resin current flowing in the direction approximately rectangular to the outer circumferential line of the section E is rather significantly slow as compared with that of the resin current flowing along the outer circumferential line. Accordingly, the resin current flowing in the direction along with the outer circumferential line of the section E is rather quickly packed to result in extremely high fiber orientation in the direction along with the outer circumferential line of the section E and rather significant difference from the fiber orientation of the reinforcing fiber in the center region (the section B). In FIG. 8, the flow of the melted resin is schematically shown with arrows illustrated with dashed lines and the state of the fiber orientation of the reinforcing fiber in the lower end part of the inner panel (the section E) and its periphery is schematically shown with alternate long and short dash lines.

It is supposed that, attributed to the difference of the fiber orientation, in the lower end part of the inner panel (the section E) and its periphery, as shown in FIG. 9, deformation is caused in the directions shown with the solid lines and particularly, significant warp (deformation) expanding from the surface is caused in approximately the center part (the portion H) along the outer circumferential line. The shrinkage directions at the time of solidification of the melted resin are schematically shown with arrows of alternate long and short dash lines in FIG. 9.

Figure 10:
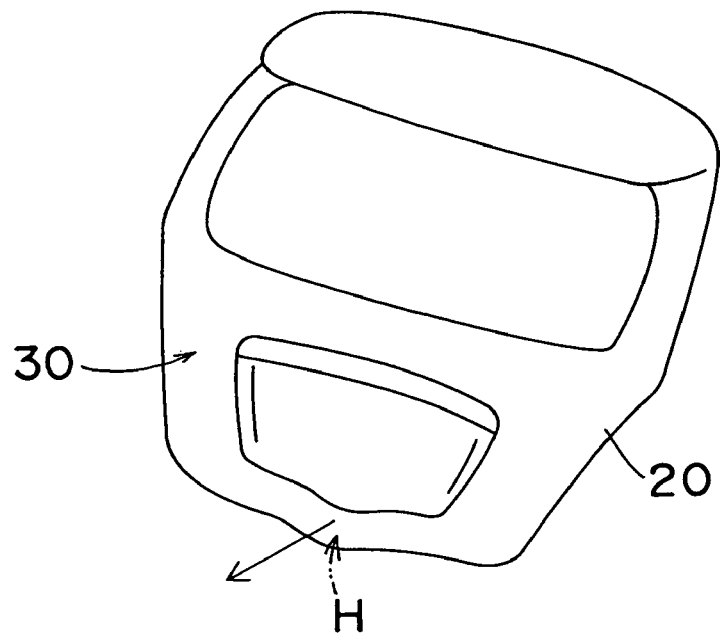
FIG. 10 is a perspective view schematically showing a tail gate in a state that the inner panel of the above-mentioned sample 1 is assembled to an outer panel.

In the case the inner panel 10 having significant deformation just like the sample 1 is to be disposed in the outer-panel 20 made of a resin to compose a tail gate 30, it becomes very difficult to assemble both panels and even if they are assembled, because of the so significant deformation degree of the inner panel 10, it becomes impossible to suppress and conceal the deformation by the outer panel 20. As a result, as shown in FIG. 10, deformation of the approximately center part along the outer circumferential line expanding from the surface appears in the lower end part and its periphery in the tail gate 30 itself.

Meanwhile, the sample 2 is preset so as to have the thickness of the section B including the expansion part 12 thicker than that of the sample 1 (equal to the section A and section E) and the thickness of the section C positioned in right and left sides thinner than that of the sample 1 and than those of other sections A, B, D, and E of the inner panel 10.

That is, as a predetermined side of a virtual rectangle (in this case a rectangle S) circumscribed to the inner panel 10, the longer side Sn in the lower side circumscribed to the lower end part (the section E) where the deformation is most significant is selected and the thin part (the section C) extended in parallel to either one of the other line (the shorter side Sm) crossing the longer side (Sn) of the above-mentioned virtual rectangle S and the outer circumferential line 10m of the inner panel 10 extended in the approximately same direction as the shorter side Sm is formed in the periphery of the inner panel rim part in the direction along the longer side Sn (the right and left direction in FIG. 3).

As a result of injection molding carried out while the thickness is set in such a manner, the deformation degree is considerably suppressed (suppressed to ½ or less) in the sample 2 as compared with that of the sample 1. It is supposedly attributed to that as a result of setting the gap size of the molding cavity Mc corresponding to the thin part (the section C) of the molding dies M1 and M2 to be smaller, the melted resin is made difficult to flow in the direction in which the section C is extended, that is in the direction approximately parallel to the direction of either the shorter side Sm or the direction of the outer circumferential line 10m of the inner panel 10 extended approximately in the same direction as that of the shorter side Sm. Accordingly, since the melted resin is hindered to flow in the lower end part of the inner panel, which is the section E, from the thin part C, the distribution degree of the fiber orientation is effectively prevented from becoming unevenly high in a specified direction approximately in parallel to either one of the longer side Sn of the virtual rectangle S and the outer circumferential line 10n of the inner panel 10 extended in approximately same, direction as the longer side Sn in the lower end part of the inner panel, the section E, and its periphery. Further, preferably, the thickness of the above-mentioned section B positioned in the upper side of the approximately center part in the lower end part of the inner panel 10 (that is, positioned between the center part and the gate G3) is made thick, so that the melted resin current flows better in the perpendicular direction toward the lower end part of the inner panel from the gate G3. It is also supposedly attributed to that the fiber orientation is effectively prevented from becoming unevenly high in a specified direction approximately in parallel to either one of the longer side Sn and the outer circumferential line 10n.

Figure 11:
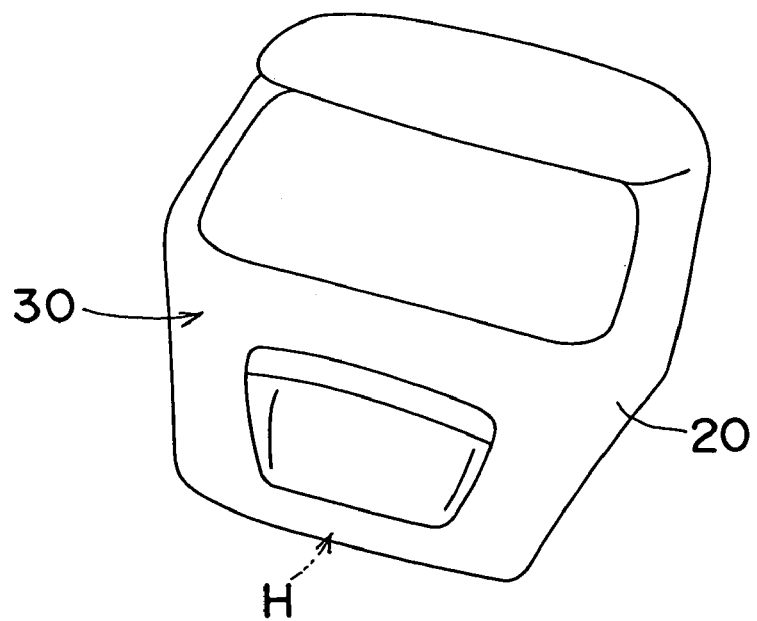
FIG. 11 is a perspective view schematically showing a tail gate in a state that the inner panel of a sample 2 for the deformation suppression test is assembled to in an outer panel.

If the deformation amount of the inner panel 10 is about the same as that of the sample 2, in the case the tail gate 30 is composed by assembling the inner panel 10 to the outer panel 20 made of a resin, the assembly is relatively easy and since the deformation degree of the inner panel 10 is relatively low, the deformation can be suppressed and concealed sufficiently by the outer panel 20. As a result, as shown in FIG. 11, no deformation, that is expanding from the surface, of the approximately center part along the outer circumferential line appears in the lower end part and its periphery in the tail gate 30.

Furthermore, to further suppress the deformation degree in the lower end part of the inner panel, in the sample 3, the thickness is set basically same as that of the sample 2 and the thickness of the section E is set to be slightly thinner than that in the sample 2 and the thickness of the section D including the region under the section B including the expansion part 12 and the lower end face 14 of the inner panel 10 is set to be slightly thicker than that in the sample 2 and also thicker than those of other sections A, B, C, and E of the inner panel 10.

Figure 12:
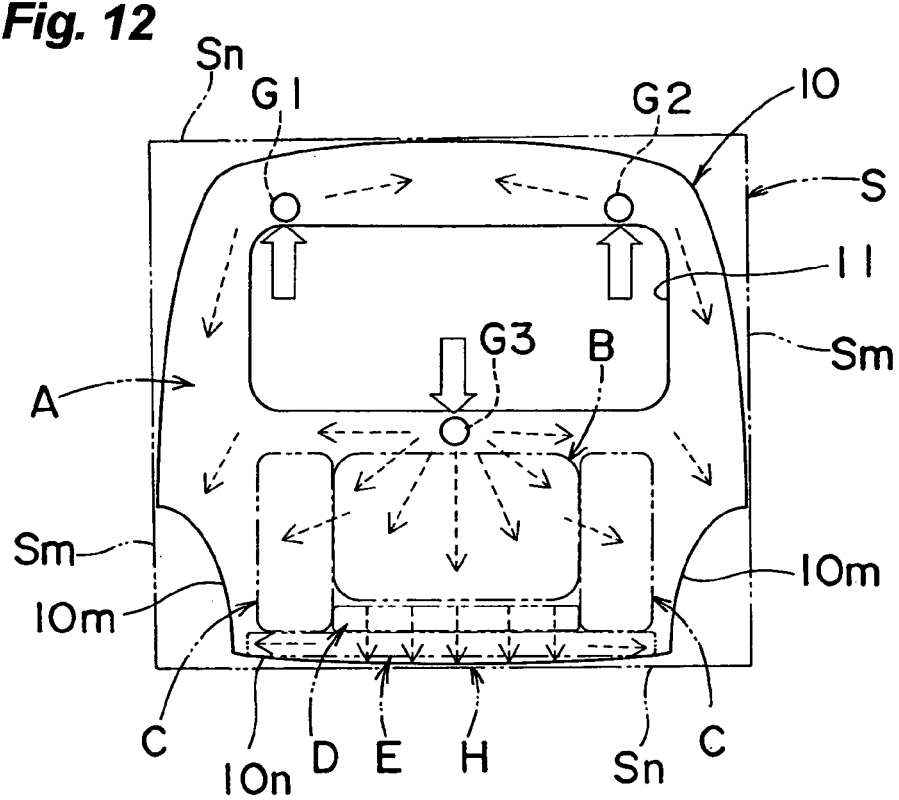
FIG. 12 is an explanatory drawing of a front view of the inner panel schematically showing a melted resin flow in a sample 3 for the deformation suppression test.

That is, as shown in FIG. 12, as a predetermined side of a virtual rectangle (in this case a rectangle S) circumscribed to the inner panel 10, the longer side Sn in the lower side circumscribed to the lower end part (the section E) where the deformation is most significant is selected and the thick part extended in parallel to either one the longer side Sn and the outer circumferential line 10n of the inner panel 10 extended in the approximately same direction as the longer side Sn is formed in the periphery of the inner panel rim part in the direction along the shorter side Sm (the up and down direction in FIG. 12).

As a result of injection molding carried out while the thickness is set in such a manner, the deformation amount is considerably suppressed (suppressed to ½ or less) in the sample 3 as compared with that of the sample 2. It is supposedly attributed to that as a result of setting the gap size of the molding cavity Md corresponding to the thick part (the section D) of the molding dies M1 and M2 to be larger, the molding cavity Md works as a resin pool and with respect to the lower end part of the inner panel, the filling amount and the filling speed of the melted resin injected from a plurality of directions can be made relatively even. Accordingly, thus fiber orientation degree is more effectively prevented from becoming particularly unevenly high in a specified direction parallel to either one of the longer side Sn of the virtual rectangle S and the outer circumferential line 10n of the inner panel 10 extended in approximately same direction as the longer side Sn to result in further efficient suppression of the occurrence of wrap and deformation in the approximately center part in the specified direction.

As described above, the thick section D is set in parallel to the terminal section E in the periphery of the terminal section E in the inner panel 10, so that the thick cavity part Md corresponding to the thick section D works as a resin pool. And, thus the resin material injected to the molding dies M1 and M2 from the gates G1, G2, and G3 flows in the above-mentioned thick cavity part Md (the resin pool) and then flows to terminal cavity part Me, so that in the terminal cavity part Me, the filling amount and the filling speed of the melted resin injected from a plurality of directions can be made relatively even and thus fiber orientation degree is prevented from becoming particularly unevenly high in a specified direction along with the above-mentioned terminal cavity part Me. As a result, occurrence of wrap and deformation in the approximately center portion H in the specified direction of the inner panel 10 can be suppressed.

In other words, with respect to the fiber-containing resin material injected into the molding dies M1 and M2 from the gates G1, G2, and G3, the fiber is hindered from orientation in the same direction as that corresponding to the lower end part of the inner panel 10 in the molding cavity part Me corresponding to the lower end part (the section E) of the inner panel 10 owing to the existence of the molding cavity part Mc corresponding to the thin part C and the molding cavity part Md corresponding to the thick part D. And, thus the fiber orientation degree is prevented from becoming particularly unevenly high in a specified direction along with the above-mentioned terminal cavity part Me corresponding to the lower end part of the inner panel 10 and as a result, occurrence of wrap and deformation in the approximately center part (the section H) in the specified direction in the lower end part of the inner panel 10 can be suppressed.

Additionally, as the means for suppressing the fiber orientation along the above specified direction in the lower end part of the inner panel 10, beside the thin part C and thick part D, other constitutions are supposedly possible. For example, ribs and boss parts are formed in the inner panel 10 and molding cavity parts corresponding to these ribs and boss parts may be arranged so as to disturb the flow of the melted resin to the molding cavity part Me corresponding to the lower end part (section E) of the inner panel 10.

Figure 13:
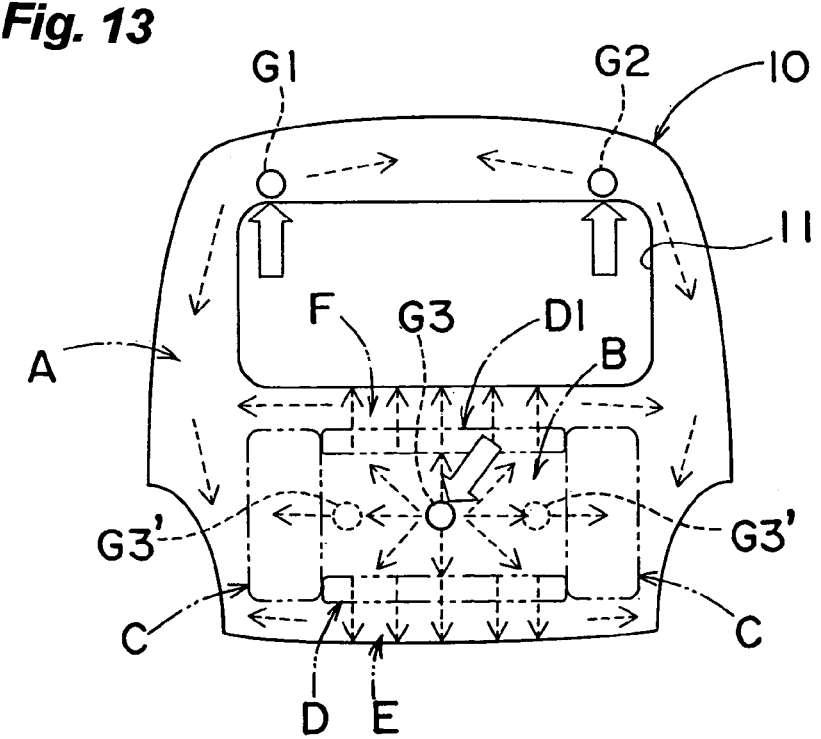
FIG. 13 is an explanatory drawing of a front view of the inner panel schematically showing a melted resin flow in a first modified example of the above-mentioned sample 3.
Figure 14:
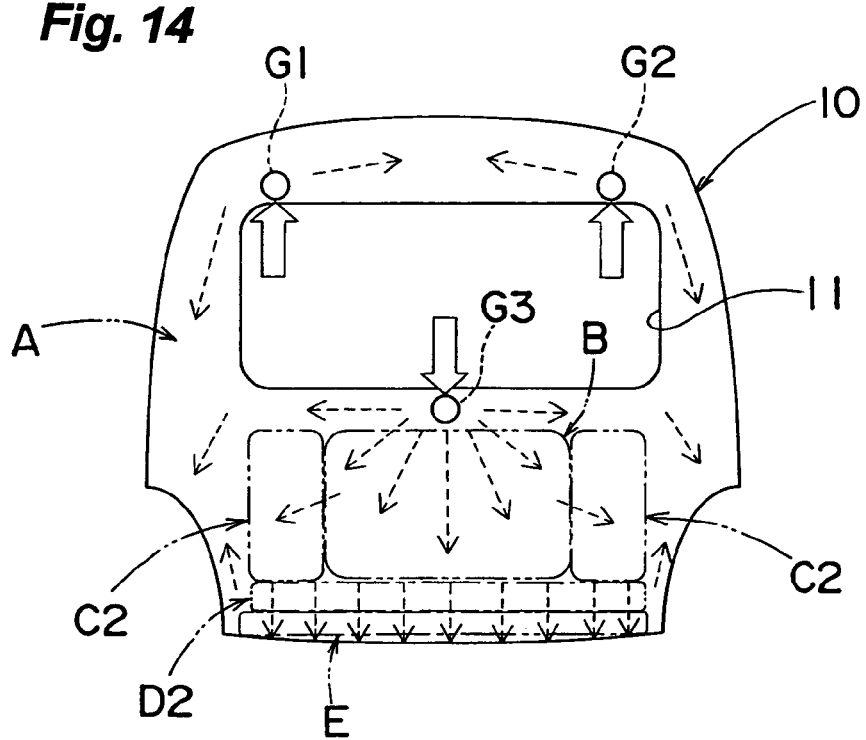
FIG. 14 is an explanatory drawing of a front view of the inner panel schematically showing a melted resin flow in a second modified example of the above-mentioned sample 3.
Figure 15:
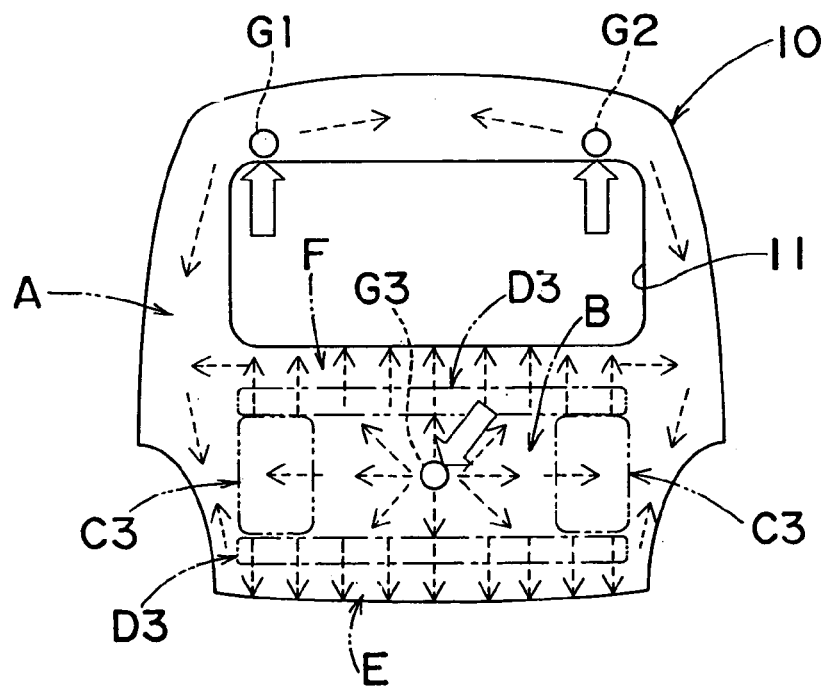
FIG. 15 is an explanatory drawing of a front view of the inner panel schematically showing a melted resin flow in a third modified example of the above-mentioned sample 3.

FIGS. 13 to 15 show explanatory drawings of front views schematically showing various modified examples based by setting the thickness of the above-mentioned sample 3. In FIGS. 13 to 15 and FIG. 16 and FIG. 17, which will be described later, the melted resin flow at the time of injection molding is schematically shown by arrows of broken lines. In the following explanation, the same symbols are marked for those having the similar constitution and the similar functions to those in the sample 3 (refer to FIG. 12) and no further explanation is given.

In a modified example shown in FIG. 13, a gate G3 for injecting the melted resin to the molding cavity corresponding to the lower part of the inner panel 10 is formed at approximately central portion of the lower part of the inner panel 10. In this case, it is preferable to form the thick part D1 similar to the above-mentioned thick part D not only in the periphery of the lower end part (the section E) of the inner panel 10 but also in the upper part of the section B in the lower part center of the inner panel. Accordingly, also in the part along the lower side inner circumferential part of the opening part 11 for a window, the melted resin from the gate G3 flows in the thick part D1 composing the resin pool and then is packed relatively evenly in the molding cavity corresponding to the section (the section F) along the lower side inner circumferential part of the opening part 11 for a window to result in efficient suppression of the deformation in this section. In this case, a plurality of gates G3 and G3' may be formed in the approximately center part of the inner panel lower part.

In the second modified example shown in FIG. 14, a thick part D2 is extended in approximately whole length of the lower end part of the inner panel (that is, to the length almost same as the lower end section E). Therefore, the length in the up and down direction of the thin part C2 is made shorter than that of the sample 3 (refer to FIG. 12). In this case since the length of the thick part D2 as the resin pool is extended, the packing direction of the molding cavity Me corresponding to the lower end section E with the melted resin can be made even as much as possible in the whole length of the inner panel lower end part and therefore the deformation can be suppressed.

The third modified example shown in FIG. 15 is similar to the second modified example shown in FIG. 14, but in the third modified example, the gate G3 for injecting the melted resin to the molding cavity corresponding to the lower part of the inner panel 10 is formed in approximately center of the lower part of the inner panel 10. In this case, the length of the thin part C3 is shortened. Also, in this case, as same as the case of the first modified example, it is preferable to form the thick part D3 similar to the thick part D2 not only in the periphery of the lower end part (the section E) of the inner panel 10 but also in the upper part of the section B in the lower part center of the inner panel. Accordingly, deformation is effectively prevented not only in the periphery of the lower end part (the section E) of the inner panel 10 but also in part (the section F) along the lower side inner circumferential part of the opening part 11 for a window.

Incidentally, the above-mentioned embodiments are exemplified by using the automotive tail gate as "the opening and closing body", however the invention should not be limited to those embodiments. It is effectively applicable, in the case of a vehicle such as an automobile, for example, to the opening and closing bodies such as a door, a bonnet, a trunk lid, a sunroof and the like. Further, the invention is effectively applicable, regardless the word of tail gate, to the opening and closing bodies for the rear part of an automotive body, which are called as a lift gate, a rear gate, a back door and the like.

Figure 16:
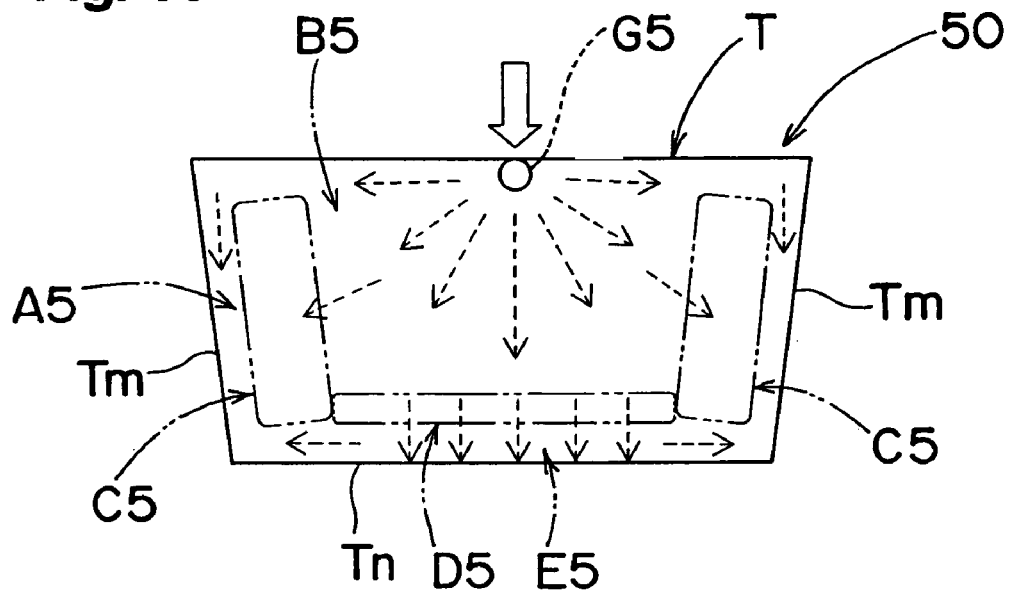
FIG. 16 is an explanatory drawing of a front view schematically showing a melted resin flow in another interior member for the deformation suppression test.
Figure 17:
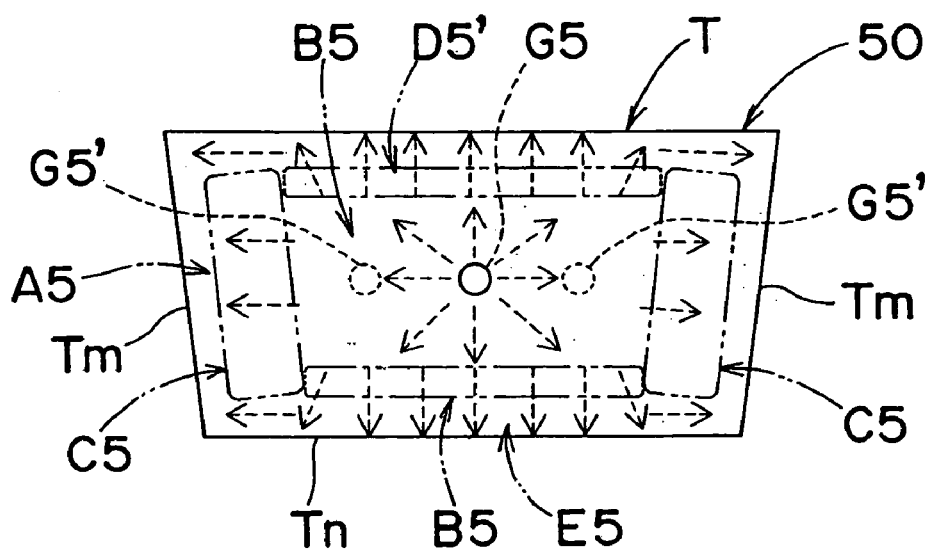
FIG. 17 is an explanatory drawing of a front view schematically showing a melted resin flow in a modified example of the above-mentioned another interior member.

FIG. 16 is an explanatory drawing of a front view schematically showing the melted resin flow in an interior member 50 having no opening for a window and FIG. 17 is an explanatory drawing of a front view schematically showing the melted resin flow in a modified example of the above-mentioned interior member.

As shown in FIG. 16, the interior member 50 has a trapezoidal shape reversed in the up and down direction in the front view. Accordingly, as the rectangle virtually circumscribed to the interior member 50, the trapezoid may be used as it is. A gate G5 is provided at the die part corresponding to the center of the upper end part of the trapezoid.

Also, in the example shown in FIG. 16, deformation is easily caused in the lower end side remote from the gate G5. Therefore, the lower side Tn circumscribed to the lower end side of the inner member where the most significant deformation is caused is selected as a predetermined side of the virtual rectangle (in this case the trapezoid T of the inner member 50 as it is) circumscribed to the inner member 50. And, a thin part C5 extended approximately in parallel to the other side (the right and left sides Tm of the trapezoid T) crossing the lower side Tn of the trapezoid T is formed in the periphery of the rim part of the inner member in the direction along the lower side Tn (in the right and left direction in FIG. 16). Also, a thick part D5 extended approximately in parallel to the side crossing the side Tm (that is the lower side Tn of the trapezoid T) is formed in the periphery of the rim part of the interior member (particularly, in the lower end part) in the direction along the side Tm of the trapezoid T.

The thick part D5 is set to be thicker than the thin part 5C, the center part B5, the lower side terminal section E5 and the periphery part A5 of the inner member 50. And, at the time of filling the molding cavity corresponding to the lower side terminal section E5 with the melted resin from the gate G5, the thick part D5 works as a resin pool. On the other hand, thin part C5 is set to be thinner than the thick part 5C as well as the center section B5, the lower side terminal section E5 and the periphery part A5 of the inner member 50. And, at the time of filling the molding cavity corresponding to the lower side terminal section E5 with the melted resin from the gate G5, the flow of the resin in the thin part D5 is slow down.

Accordingly, even if the flow of the resin is slow owing to the existence of the uneven part and expanded parts in the center section B, with respect to the lower side terminal section E5 of the interior member 50, the filling direction of the melted resin to the molding cavity corresponding to the lower side terminal section E5 can be even as much as possible to suppress the deformation.

In the example shown in FIG. 17, the gate G5 for injecting the melted. resin to the molding die is formed in the approximately center of the interior member 50. In this case, it is preferable to form thick parts D5' similar to the above-mentioned thick part D5 not only in the periphery of the lower end terminal part (the section E5) of the inner member 50 but also in the upper part of the central section B of the interior member 50. Accordingly, even in the upper side terminal part (the section F5) of the interior member 50, the melted resin from the gate G5 flows in the thick part D5' composing the resin pool and then is packed relatively evenly in the molding cavity corresponding to the upper side terminal part (the section F) to effectively suppress the deformation in the section. Additionally, in this case, a plurality of gates G5 and G5' may be formed in approximately center part of the interior member 50.

In the above-mentioned embodiments, all of the thick parts are formed in the periphery of the end part of the interior member in the side (that is, the shorter side Sm of the rectangle or the side of a trapezoid) crossing a predetermined side (that is the longer side Sn of the rectangle or the lower side of the trapezoid) of a virtual rectangle circumscribed to the interior member. However, the thick parts may be not only formed in the periphery of the rim part of the inner member but also extended parallel to either one of the predetermined side of the above-mentioned virtual rectangle and the outer circumferential line of the inner member extended in the same direction as that of the predetermined side in the center part of the interior member.

Further, in the above-mentioned embodiments, so-called inner panels are exemplified as "the interior member for the opening and closing body", they are not limited to them and may be any, for example inner side frames or inner side trims to be added thereto or solely if they can be attached to the inside of the outer panel.

In such a manner, the invention should not be limited to the above-mentioned embodiments and modifications and improvements in the designs can be made without departing from the spirit and scope of the invention.

APPLICABILITY OF THE INVENTION

As described above, according to the present invention, it is possible to enhance rigidity of a member by improving the modulus of bend elasticity by adding a reinforcing fiber and to assure impact resistance by adding a rubber component, without deteriorating the moldability of the resin material and the appearance in form of a molded product. Thereby, it is possible to obtain an interior member with good moldability, good appearance as a molded product and also required rigidity and impact resistance. Accordingly, the invention is preferably applicable to the resin-made interior member for a door, a bonnet, a trunk lid, a sunroof, a lift gate (also called as a tail gate, a rear gate, or a back door) to be attached to the inner side of the outer panel of an opening and closing body of a vehicle such as an automobile.

What is claimed is:

1. A resin-made interior member, to be attached to an inner side of an outer panel of an opening and closing member, comprising:
   a structure molded by an injection molding method using a molding material of a polypropylene type resin containing a reinforcing fiber and rubber, the structure defining a plurality of sections;
   when considering a virtual rectangular shape that circumscribes the interior member in a front view, one of the sections being a thin part being provided in a periphery of an end portion of the interior member in a direction along a predetermined side of the virtual rectangular shape while being extended approximately in parallel to either another side of the virtual rectangular shape crossing the predetermined side or an outer circumferential line of the interior member being extended in approximately a same direction as the another side, the thin part includes a thickness that is thinner than the other sections of the structure, the thin part comprising a pair of thin parts being provided in the periphery of the end portion of the interior member, and
   one of the sections being at least one thick part being provided in the periphery of an end portion of the interior member in a direction along one side of the virtual rectangular shape while being extended approximately in parallel to either a predetermined side of the virtual rectangle crossing the one side or an outer circumferential line of the interior member being extended approximately in the same direction as the predetermined side, the thick part includes a thickness that is thicker than the other sections of the structure; and
   when considering a virtual rectangular shape that circumscribes the interior member in a front view, a location at where the polypropylene type resin can be injected, the location is disposed above at least one of said at least one thick part and is disposed between the pair of thin parts.

2. The resin-made interior member for an opening and closing member as claimed in claim 1, wherein the interior member has an opening part for a window.

3. A resin-made interior member to be attached to an inner side of an outer panel, comprising:
   a structure molded by an injection molding method using a molding material of a polypropylene type resin containing a reinforcing fiber and rubber, the structure defining a plurality of sections;
   when considering a virtual rectangular shape that circumscribes the interior member in a front view, one of the sections being a thin part being provided in a periphery of an end portion of the interior member in a direction along a predetermined side of the virtual rectangular shape while being extended approximately in parallel to either another side of the virtual rectangular shape crossing the predetermined side or an outer circumferential line of the interior member being extended in approximately a same direction as the another side, the thin part includes a thickness that is thinner than the other sections of the structure, the thin part comprising a pair of thin parts being provided in the periphery of the end portion of the interior member, and
   one of the sections being at least one thick part being provided in the periphery of an end portion of the interior member in a direction along one side of the virtual rectangular shape while being extended approximately in parallel to either a predetermined side of the virtual rectangle crossing the one side or an outer circumferential line of the interior member being extended approximately in the same direction as the predetermined side, the thick part includes a thickness that is thicker than the other sections of the structure; and
   when considering a virtual rectangular shape that circumscribes the interior member in a front view, a location at where the polypropylene type resin can be injected, the location is disposed above at least one of said at least one thick part and is disposed between the pair of thin parts.

4. A molding method of a resin-made interior member, to be attached to an inner side of an outer panel of an opening and closing member, comprising
   passing a resin material injected to a molding die from a gate to a thick cavity part corresponding to at least one thick part set approximately in parallel to a terminal part in a periphery of the terminal part of the interior member, and when considering a virtual rectangular shape that circumscribes the interior member in a front view, the thick part being provided in the periphery of the terminal part of the interior member in a direction along one side of the virtual rectangular shape while being extended approximately in parallel to either a predetermined side of the virtual rectangle crossing the one side or an outer circumferential line of the interior member being extended approximately in the same direction as the predetermined side, the step of passing a resin material to a thick cavity part including forming the thick part with a thickness that is thicker than the terminal part and is thicker than other sections forming the interior member;
   passing a resin material injected to a molding die from a gate to a thin cavity part corresponding to a thin part, and when considering a virtual rectangular shape that circumscribes the interior member in a front view, the thin part being provided in a periphery of the terminal part of the interior member in a direction along a predetermined side of the virtual rectangular shape while being extended approximately in parallel to either another side of the virtual rectangular shape crossing the predetermined side or an outer circumferential line of the interior member being extended in approximately a same direction as the another side, the step of passing a resin material to a thin cavity part including forming the thin part with a thickness that is thinner than other sections forming the interior member, the thin part comprising a pair of thin parts being provided in the periphery of the terminal part of the interior member; and
   passing a resin material to a terminal cavity part corresponding to the terminal part,
   wherein the resin material is a polypropylene type resin containing a reinforcing fiber and rubber, and
   when considering a virtual rectangular shape that circumscribes the interior member in a front view, a location at where the polypropylene type resin can be injected, the location is disposed above at least one of said at least one thick part and is disposed between the pair of thin parts.

5. A molding die of a resin-made interior member to be attached to an inner side of an outer panel of an opening and closing member, the molding die comprising:
   a terminal cavity part corresponding to the terminal part of the interior member;
   a gate cavity part having a gate for a resin material injection;
   a thick cavity part having a gap size wider than that of both of the former cavities and being provided approximately in parallel to the terminal cavity part and between the former cavities, the thick cavity part being configured to pass a resin material injected to the molding die from a gate, the thick cavity part corresponding to at least one thick part set approximately in parallel to the terminal part in a periphery of the terminal part of the interior member, and when considering a virtual rectangular shape that circumscribes the interior member in a front view, the thick part being provided in the periphery of the terminal part of the interior member in a direction along one side of the virtual rectangular shape while being extended approximately in parallel to either a predetermined side of the virtual rectangle crossing the one side or an outer circumferential line of the interior member being extended approximately in the same direction as the predetermined side, where passing the resin material to the thick cavity part including forming the thick part with a thickness that is thicker than the terminal part and is thicker than other sections forming the interior member;
   a thin cavity part being configured to pass a resin material injected to the molding die from a gate, the thin cavity part corresponding to a thin part, and when considering a virtual rectangular shape that circumscribes the interior member in a front view, the thin part being provided in a periphery of the terminal part of the interior member in a direction along a predetermined side of the virtual rectangular shape while being extended in approximately in parallel to either another side of the virtual rectangular shape crossing the predetermined side or an outer circumferential line of the interior member being extended in approximately a same direction as the another side where passing the resin material to the thin cavity part including forming the thin part with a thickness that is thinner than other sections forming the interior member, the thin part comprising a pair of thin parts being provided in the periphery of the terminal part of the interior member; and a cavity path for introducing the resin material injected through the gate to the thick cavity part via the gate cavity part, and then to the terminal cavity part, wherein the resin material is a polypropylene type resin containing a reinforcing fiber and rubber, and when considering a virtual rectangular shape that circumscribes the interior member in a front view, a location at where the polypropylene type resin can be injected, the location is disposed above at least one of said at least one thick part and is disposed between the pair of thin parts.

* * * * *

UNITED STATES PATENT AND TRADEMARK OFFICE
CERTIFICATE OF CORRECTION

PATENT NO. : 7,270,863 B2 Page 1 of 1
APPLICATION NO. : 10/513863
DATED : September 18, 2007
INVENTOR(S) : Harima et al.

It is certified that error appears in the above-identified patent and that said Letters Patent is hereby corrected as shown below:

On the title page, item [73]:

(73) Assignees, "DaikyoNishikawa Corporation, Hiroshima-ken (JP)" should read

--DaikyoNishikawa Corporation, Hiroshima-ken (JP), Idemitsu Kosan Co., Ltd., Tokyo (JP), Mazda Motor Corporation, Hiroshima (JP)--.

Signed and Sealed this

Seventeenth Day of February, 2009

JOHN DOLL
*Acting Director of the United States Patent and Trademark Office*